United States Patent Office 2,990,331
Patented June 27, 1961

2,990,331
STABLE SOLUTIONS OF SALTS OF TETRA-CYCLINES FOR PARENTERAL ADMINISTRATION
Horst Neumann, Bingen (Rhine), Paul Viehmann, Ingelheim (Rhine), and Herbert Hafer, Mainz-Bretzenheim, Germany, assignors, by mesne assignments, to Chas. Pfizer & Co., Inc., Brooklyn, N.Y., a corporation of Delaware
No Drawing. Filed Nov. 15, 1957, Ser. No. 696,599
Claims priority, application Germany Nov. 23, 1956
23 Claims. (Cl. 167—65)

This invention relates to stable solutions of salts of tetracyclines for parenteral administration, and more particularly to aqueous solutions of salts of tetracyclines comprising magnesium ions, an alkali metal bisulfite or alkali earth metal bisulfite, a physiologically compatible carboxylic acid amide and a sufficient amount of a water-soluble organic or inorganic base to adjust the pH of the solution to a value near the neutral point.

It is well known that the salts of tetracyclines adapted for parenteral administration, i.e. oxytetracycline hydrochloride and tetracycline hydrochloride, can be retained in aqueous solution only if the solution is either acid or alkaline (Goodman and Gilman, "The Pharmacological Basis of Therapeutics," second edition (1956), page 1384). If such aqueous solutions of the salts of these tetracyclines are adjusted to a pH-value in the vicinity of the neutral point, i.e. to a pH-value in the range of about 5.5 to 8.0, the antibiotic component begins to precipitate out.

Because of the acidity or alkalinity of such solutions, however, their tissue compatibility is substantially reduced. Thus, there has long been a real need for some means of providing stable aqueous solutions of salts of tetracyclines having a pH-value in the vicinity of the neutral point.

We have found that it is possible to obtain stable aqueous solutions of salts of tetracyclines, for example of oxytetracycline hydrochloride or tetracycline hydrochloride, having a pH-value between 5.0 and 7.0, if aqueous solutions of these salts which are customarily modified by addition of magnesium ions and of an alkali metal bisulfite or calcium or magnesium bisulfite are further modified by the addition of a physiologically compatible carboxylic acid amide in the role of solubility promoters, and the solutions are simultaneously admixed with a sufficient quantity of a water-soluble organic or inorganic base to adjust the solution to a pH-value near the neutral point, preferably to a pH of 5.0 to 7.0.

Preferred physiologically compatible carboxylic acid amides for the purpose of the present invention are the alkylol amides of acetic acid and lactic acid, but the amides of $\beta$-hydroxybutyric acid, succinic acid, adipic acid, tartaric acid, glycolic acid or salicylic acid may also be used.

Preferred water-soluble organic or inorganic bases for the purposes of the present invention are sodium hydroxide and readily water-soluble alkylolamines, such as ethanolamine and diethanolamine. However, other alkylolamines, such as $\beta,\gamma$-dihydroxy-propylamine, 1-amino-propanol-2, 1-amino-propanol-3, di-isopropanolamine, 1,2-dimethyl-ethanolamine, N-aminoethyl-ethanolamine and 2-amino-2-ethyl propanediol-1,3, may also be satisfactorily employed.

We have further discovered that it is advantageous to use the alkylolamine for the adjustment of the pH-value of the solution which corresponds to the basic moiety of the carboxylic acid amide used. For example, if the carboxylic acid amide added to the solution is lactic acid-hydroxyethyl amide, it is advantageous, but not absolutely essential, to adjust the pH of the solution to near the neutral point with ethanolamine.

The stable aqueous solutions of salts of tetracyclines in accordance with the present invention make it possible to administer the salts parenterally without irritation of the neighboring tissue. Moreover, they permit an increase in the dosage of the antibotic to be injected, so that the number of individual injections can be materially reduced.[1]

The following examples will further illustrate the present invention and enable others skilled in the art to understand our invention more completely. It is understood, however, that the invention is not limited to the terms of the particular examples given below.

Example I 1.1 gm. oxytetracycline hydrochloride were admixed with 1.0 gm. magnesium chloride-hexahydrate. Thereafter, the mixture of these salts was dissolved in 8.0 cc. of a 0.5% aqueous sodium bisulfiate solution, and the resulting solution was admixed with 9.5 gm. lactic acid-hydroxyethyl amide. The pH of the solution was then adjusted to 5.8 with an aqeous 10% monoethanolamine solution, and then diluted to a volume of 21.0 cc. with distilled water. The resulting aqueous solution of oxytetracycline hydrochloride remained stable over a long period of time, and when parenterally administered did not cause discomfort, such as irritation of the neighboring tissue, to the patient.

The same results were obtained when tetracycline hydrochloride was substituted for oxytetracycline hydrochloride.

Example II 1.1 gm. oxytetracycline hydrochloride were admixed with 1.0 gm. magnesium chloride-hexahydrate. The resulting mixture was then dissolved in 8.0 cc. of a 0.5% aqueous sodium bisulfite solution, and the resulting solution was admixed with 9.5 gm. acetic acid-hydroxyethyl amide. Thereafter, the pH of the solution was adjusted to 6.5 with a 10% aqueous monoethanolamine solution, and then diluted to a volume of 21.0 cc. with distilled water. The oxytetracycline hydrochloride solution thus obtained remained stable over a long period of time, and when parenterally administered did not cause any discomfort, such as irritation of the neighboring tissue, to the patient.

The same results were obtained when tetracycline hydrochloride was substituted for oxytetracycline hydrochloride.

Example III 1.1 gm. oxytetracycline hydrochloride were admixed with 1.0 gm. magnesium chloride-hexahydrate, and the resulting mixture was dissolved in 8.0 cc. of a 0.5% aqueous sodium bisulfite solution. The resulting solution was

[1] The solutions according to the invention are preferably prepared with exclusion of air.

admixed with 9.5 gm. lactic acid-hydroxyethyl amide. The pH of the resulting solution was then adjusted to 5.8 with a 10% aqueous diethanolamine solution, and subsequently diluted to a volume of 21.0 cc. with distilled water. The resulting aqueous oxytetracycline hydrochloride solution remained stable over a long period of time, and when parenterally administered did not cause any discomfort, such as irritation of the neighboring tissue, to the patient.

*Example IV*

1.1 gm. oxytetracycline hydrochloride were admixed with 1.0 gm. magnesium chloride-hexahydrate, and the resulting mixture was dissolved in 8.0 cc. of a 0.5% aqueous sodium bisulfite solution. The resulting solution was then admixed with 9.5 gm. acetic acid-hydroxyethyl amide. The pH of the solution was then adjusted to 6.2 with 1 N sodium hydroxide, and finally diluted to a volume of 21.0 cc. with distilled water. The resulting aqueous oxytetracycline hydrochloride solution remained stable over a long period of time, and when parenterally administered did not cause any discomfort, such as irritation of the neighboring tissue, to the patient.

*Example V*

1.1 gm. tetracycline hydrochloride were admixed with 1.0 gm. magnesium chloride-hexahydrate, and the resulting mixture was dissolved in 8.0 cc. of a 0.5% aqueous sodium bisulfite solution. The resulting solution was admixed with 9.5 gm. lactic acid hydroxyethyl amide. Thereafter, the pH of the solution was adjusted to 5.5 with 1 N sodium hydroxide, and the total solution was diluted to a volume of 21.0 cc. with distilled water. The resulting aqueous tetracycline hydrochloride solution remained stable over a long period of time, and when parenterally administered did not cause any discomfort, such as irritation of the neighboring tissue, to the patient.

*Example VI*

1.1 gm. tetracycline hydrochloride were admixed with 1.0 gm. magnesium chloride-hexahydrate, and the resulting mixture was dissolved in 8.0 cc. of 0.5% aqueous sodium bisulfite solution. The resulting solution was admixed with 9.5 gm. acetic acid-hydroxyethyl amide. The pH of the solution was then adjusted to 6.0 with a 10% aqueous diethanolamine solution, and the total solution was diluted to a volume of 21.0 cc. with distilled water. The resulting aqueous tetracycline hydrochloride solution remained stable over a long period of time, and when parenterally administered did not cause any discomfort, such as irritation of the neighboring tissue, to the patient.

*Example VII*

1.1 gm. oxytetracycline hydrochloride were admixed with 1.0 gm. magnesium chloride-hexahydrate. Thereafter, the resulting mixture was dissolved in 8.0 cc. of a 0.5% aqueous sodium bisulfite solution, and the resulting solution was admixed with 9 gm. tartaric acid-di-(3-hydroxypropyl)-amide. Subsequently, the pH of the solution was adjusted to 5.9 with 1 N sodium hydroxide, and the total solution was diluted to a volume of 21.0 cc. with distilled water. The resulting aqueous oxytetracycline hydrochloride solution remained stable over a long period of time, and when parenterally administered did not cause any discomfort, such as irritation of the neighboring tissue, to the patient.

The same results were obtained when tetracycline hydrochloride was substituted for oxytetracycline hydrochloride.

*Example VIII*

1.1 gm. oxytetracycline hydrochloride were admixed with 1.0 gm. magnesium chloride-hexahydrate, and the resulting mixture was dissolved in 8.0 cc. of a 0.5% aqueous sodium bisulfite solution. The resulting solution was then admixed with 10.0 gm. succinic acid-1,2-dihydroxypropyl amide. Thereafter, the pH of the solution was adjusted to 5.8 with an aqueous 1,2-dihydroxypropylamine solution, and the total solution was diluted to a volume of 21.0 cc. with distilled water. The resulting aqueous oxytetracycline hydrochloride solution remained stable over a long period of time, and when parenterally administered did not cause any discomfort, such as irritation of the neighboring tissue, to the patient.

The same results were obtained when tetracycline hydrochloride was substituted for oxytetracycline hydrochloride.

*Example IX*

1.1 gm. oxytetracycline hydrochloride were admixed with 1.0 gm. magnesium chloride-hexahydrate, and the resulting mixture was dissolved in 8.0 cc. of a 0.5% aqueous sodium bisulfite solution. The resulting solution was then admixed with 9.5 gm. salicylic acid-ethanol-1-methyl-isopropanol amide. The pH of the resulting solution was then adjusted to 5.9 with an aqueous monoethanolamine solution, and the total solution was finally diluted to a volume of 21.0 cc. with distilled water. The resulting aqueous oxytetracycline hydrochloride solution remained stable over a long period of time, and when parenterally administered did not cause any discomfort, such is irritation of the neighboring tissue, to the patient.

The same results were obtained when tetracycline hydrochloride was substituted for oxytetracycline hydrochloride.

In all the preceding examples the same results were obtained when calcium bisulfite or magnesium bisulfite were substituted for sodium bisulfite.

*Example X*

1.1 gm. oxytetracycline hydrochloride were admixed with 1.0 gm. magnesium chloride-hexahydrate. Thereafter, the mixture of these salts was dissolved in 8.0 cc. of a 0.5% aqueous magnesium bisulfite solution, and the resulting solution was admixed with 9.5 gm. lactic acid-hydroxyethyl amide. The pH of the solution was then adjusted to 5.8 with an aqueous 10% monoethanolamine solution, and then diluted to a volume of 21.0 cc. with distilled water. The resulting aqueous solution of oxytetracycline hydrochloride remained stable over a long period of time, and when parenterally administered did not cause discomfort, such as irritation of the neighboring tissue, to the patient.

The same results were obtained when tetracycline hydrochloride was substituted for oxytetracycline hydrochloride.

*Example XI*

1.1 gm. oxytetracycline hydrochloride were admixed with 1.0 gm. magnesium chloride-hexahydrate. The resulting mixture was then dissolved in 8.0 cc. of a 0.5% aqueous calcium bisulfite solution, and the resulting solution was admixed with 9.5 gm. acetic acid-hydroxyethylamide. Thereafter, the pH of the solution was adjusted to 6.5 with a 10% aqueous monoethanolamine solution, and then diluted to a volume of 21.0 cc. with distilled water.

The same results were obtained when tetracycline hydrochloride was substituted for oxytetracycline hydrochloride.

While we have illustrated the present invention with the aid of certain specific embodiments thereof, it will be readily apparent to those skilled in the art that the invention is not limited to these embodiments and that various changes and modifications may be made without departing from the spirit of the invention or the scope of the appended claims.

We claim:

1. The process of producing a stable aqueous solution of a salt of a tetracycline compound selected from the group consisting of oxytetracycline and tetracycline, which comprises admixing said salt of a tetracycline compound with a water-soluble, ionizable magnesium compound, dissolving the resulting mixture in an aqueous solution of a bisulfite selected from the group consisting of alkali metal bisulfites and calcium and magnesium bisulfites, adding to the resulting solution a physiologically compatible carboxylic acid amide and adjusting the pH of the solution to a value from 5.0 to 7.0 with a water-soluble, physiologically compatible base.

2. The process of producing a stable aqueous solution of a salt of a tetracycline compound selected from the group consisting of oxytetracycline and tetracycline, which comprises admixing said salt of a tetracycline compound with magnesium chloride-hexahydrate, dissolving the resulting mixture in an aqueous sodium bisulfite solution, adding to the resulting solution a physiologically compatible carboxylic acid alkylol amide and adjusting the pH of the solution to a value from 5.0 to 7.0 with an alkylolamine.

3. The process of producing a stable aqueous solution of a salt of a tetracycline compound selected from the group consisting of oxytetracycline and tetracycline, which comprises admixing said salt of a tetracycline compound with magnesium chloride-hexahydrate, dissolving the resulting mixture in an aqueous sodium bisulfite solution, adding to the resulting solution a physiologically compatible carboxylic acid alkylol amide selected from the group consisting of acetic acid alkylol amides, tartaric acid alkylol amides, lactic acid alkylol amides, salicylic acid-ethanol-1-methyl-alkylol amides and succinic acid alkylol amides, and adjusting the pH of the solution to a value from 5.0 to 7.0 with the alkylolamine corresponding to the alkylolamino radical in said carboxylic acid alkylol amide.

4. A stable aqueous solution of a salt of a tetracycline compound consisting of water, a salt of a tetracycline compound selected from the group consisting of oxytetracycline and tetracycline, magnesium ions, a bisulfite selected from the group consisting of alkali metal bisulfites and calcium and magnesium bisulfites, a physiologically compatible carboxylic acid amide and a water-soluble, physiologically compatible base in an amount sufficient to adjust the pH of the solution to a value between 5.0 and 7.0.

5. A stable aqueous solution of a salt of a tetracycline compound consisting of water, a salt of a tetracycline compound selected from the group consisting of oxytetracycline and tetracycline, magnesium ions, sodium bisulfite, a physiologically compatible carboxylic acid alkylol amide and a sufficient amount of an alkylolamine to adjust the pH of the solution to a value between 5.0 and 7.0.

6. A stable aqueous solution of a salt of a tetracycline compound consisting of water, a salt of a tetracycline compound selected from the group consisting of oxytetracycline and tetracycline, magnesium ions, sodium bisulfite, a physiologically compatible carboxylic acid alkylol amide selected from the group consisting of acetic acid alkylol amides, lactic acid alkylol amides and tartaric acid alkylol amides, and the alkylolamine corresponding to the alkylolamino radical in said carboxylic acid alkylol amide in an amount sufficient to adjust the pH of the solution to a value between 5.0 and 7.0.

7. A stable aqueous solution of oxytetracycline hydrochloride consisting of water, oxytetracycline hydrochloride, magnesium chloride-hexahydrate, sodium bisulfite, lactic acid-hydroxyethyl amide and a sufficient amount of monoethanolamine to adjust the pH of the solution to a value between 5.0 and 7.0.

8. A stable aqueous solution of tetracycline hydrochloride consisting of water, tetracycline hydrochloride, magnesium chloride-hexahydrate, sodium bisulfite, lactic acid-hydroxyethyl amide and a sufficient amount of monoethanolamine to adjust the pH of the solution to a value between 5.0 and 7.0.

9. A stable aqueous solution of oxytetracycline hydrochloride consisting of water, oxytetracycline hydrochloride, magnesium chloride-hexahydrate, sodium bisulfite, acetic acid-hydroxyethyl amide and a sufficient amount of monoethanolamine to adjust the pH of the solution to a value between 5.0 and 7.0.

10. A stable aqueous solution of tetracycline hydrochloride consisting of water, tetracycline hydrochloride, magnesium chloride hexahydrate, sodium bisulfite, acetic acid-hydroxyethyl amide and a sufficient amount of monoethanolamine to adjust the pH of the solution to a value between 5.0 and 7.0.

11. A stable aqueous solution of oxytetracycline hydrochloride consisting of water, oxytetracycline hydrochloride, magnesium chloride-hexahydrate, sodium bisulfite, lactic acid-hydroxyethyl amide and a sufficient amount of diethanolamine to adjust the pH of the solution to a value between 5.0 and 7.0.

12. A stable aqueous solution of oxytetracycline hydrochloride consisting of water, oxytetracycline hydrochloride, magnesium chloride-hexahydrate, sodium bisulfite, acetic acid-hydroxyethyl amide, and a sufficient amount of sodium hydroxide to adjust the pH of the solution to a value between 5.0 and 7.0.

13. A stable aqueous solution of tetracycline hydrochloride consisting of water, tetracycline hydrochloride, magnesium chloride-hexahydrate, sodium bisulfite, lactic acid-hydroxyethyl amide and a sufficient amount of sodium hydroxide to adjust the pH of the solution to a value between 5.0 and 7.0.

14. A stable aqueous solution of tetracycline hydrochloride consisting of water, tetracycline hydrochloride, magnesium chloride-hexahydrate, sodium bisulfite, acetic acid-hydroyethyl amide and a sufficient amount of diethanolamine to adjust the pH of the solution to a value between 5.0 and 7.0.

15. A stable aqueous solution of oxytetracycline hydrochloride consisting of water, oxytetracycline hydrochloride, magnesium chloride-hexahydrate, sodium bisulfite, lactic acid (3-hydroxypropyl)-amide and a sufficient amount of sodium hydroxide to adjust the pH of the solution to a value between 5.0 and 7.0.

16. A stable aqueous solution of tetracycline hydrochloride consisting of water, tetracycline hydrochloride, magnesium chloride-hexahydrate, sodium bisulfite, lactic acid-(3-hydroxypropyl)-amide and a sufficient amount of sodium hydroxide to adjust the pH of the solution to a value between 5.0 and 7.0.

17. A stable aqueous solution of oxytetracycline hydrochloride consisting of water, oxytetracycline hydrochloride, magnesium chloride-hexahydrate, sodium bisulfite, succinic acid-1,2-dihydroxypropyl amide and a sufficient amount of 1,2-dihydroxypropylamine to adjust the pH of the solution to a value between 5.0 and 7.0.

18. A stable aqueous solution of tetracycline hydrochloride consisting of water, tetracycline hydrochloride, magnesium chloride-hexahydrate, sodium bisulfite, succinic acid-1,2-dihydroxypropyl amide and a sufficient amount of 1,2-dihydroxypropylamine to adjust the pH of the solution to a value between 5.0 and 7.0.

19. A stable aqueous solution of oxytetracycline hydrochloride consisting of water, oxytetracycline hydrochloride, magnesium chloride-hexahydrate, sodium bisulfite, salicylic acid-1,2-dimethyl-ethanol amide and a sufficient amount of monoethanolamine to adjust the pH of the solution to a value between 5.0 and 7.0.

20. A stable aqueous solution of tetracycline hydrochloride consisting of water, tetracycline hydrochloride consisting of water, tetracycline hydrochloride, magnesium chloride-hexahydrate, sodium bisulfite, salicylic acid-1,2-dimethyl-ethanol amide and a sufficient amount of monoethanolamine to adjust the pH of the solution to a value between 5.0 and 7.0.

21. A stable aqueous solution of oxytetracycline hydrochloride consisting of water, oxytetracycline hydrochloride, magnesium chloride-hexahydrate, sodium bisulfite, tartaric acid-di-(3-hydroxypropyl)-amide and a sufficient amount of sodium hydroxide to adjust the pH of the solution to a value between 5.0 and 7.0.

22. A stable aqueous solution of tetracycline hydrochloride consisting of water, tetracycline hydrochloride, magnesium chloride-hexahydrate, sodium bisulfite, tartaric acid-di-(3-hydroxypropyl)-amide and a sufficient amount of sodium hydroxide to adjust the pH of the solution to a value between 5.0 and 7.0.

23. Product according to claim 4 characterized in that air is substantially excluded from the solutions.

References Cited in the file of this patent

UNITED STATES PATENTS

| | | |
|---|---|---|
| 2,089,212 | Kritchevsky | Aug. 10, 1937 |
| 2,736,725 | Ritter | Feb. 28, 1956 |

FOREIGN PATENTS

| | | |
|---|---|---|
| 201,633 | Australia | Apr. 28, 1955 |

OTHER REFERENCES

Gans: J.A.P.A., Sci. Ed., Oct. 5, 1957, pp. 587, 591.